United States Patent [19]

Kojima

[11] Patent Number: 5,991,496
[45] Date of Patent: Nov. 23, 1999

[54] RECORDING/REPRODUCING APPARATUS AND METHOD THEREOF

[75] Inventor: Thoshiaki Kojima, Kanagawa, Japan

[73] Assignee: Sony Corporation, Tokyo, Japan

[21] Appl. No.: 08/754,914

[22] Filed: Nov. 22, 1996

[30] Foreign Application Priority Data

Nov. 29, 1995 [JP] Japan ..................................... 7-333999

[51] Int. Cl.$^6$ ........................................................ H04N 5/91
[52] U.S. Cl. ............................................... 386/54; 386/96
[58] Field of Search .................................. 386/54, 96, 99, 386/104, 105, 106, 109, 39, 33, 95; 360/32; H04N 5/91

[56] References Cited

U.S. PATENT DOCUMENTS

4,777,537  10/1988  Ueno et al. ............................... 386/96

*Primary Examiner*—Robert Chevalier
*Attorney, Agent, or Firm*—Frommer Lawrence & Haug, LLP; William S. Frommer

[57] ABSTRACT

An A/V signal region for A/V signals and an audio signal region for only audio signals of the A/V signals are disposed on a record medium of a HDD. When the audio signals and the video signals of the A/V signals are independently edited, the A/V signal region is sought from the audio signal region. Each channel of the audio signals in the audio signal region is sought. Thereafter, the A/V signal region is sought. Since the number of sectors of the audio signals is smaller than that of the video signals and thereby the track width of the audio signal region is smaller than that of the A/V signal region, the seek distance in the region is small. Thus, the seek time can be decreased. When the edit point of an audio signal is the same as the edit point of a video signal or when an A/V signal is successively reproduced, only the A/V signal region is used. Thus, the A/V signal can be reproduced at very high speed.

54 Claims, 9 Drawing Sheets

RECORDING/REPRODUCING APPARATUS AND METHOD THEREOF

BACKGROUND OF THE INVENTION

1. Field of the Invention

The present invention relates to an A/V (Audio and/or Video) signal recording/reproducing apparatus for recording a video signal and an audio signal with many channels and a recording method thereof.

2. Description of the Prior Art

Conventionally, an A/V signal composed of an audio signal and a video signal is recorded on a magnetic tape. Such a magnetic tape is referred to as a linear record medium because the A/V signal is linearly recorded on time axis.

Figure 4A:
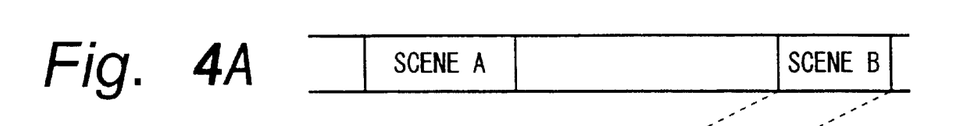
FIGS. 4A and 4B are schematic diagrams for explaining an edit operation of a magnetic tape.
Figure 4B:
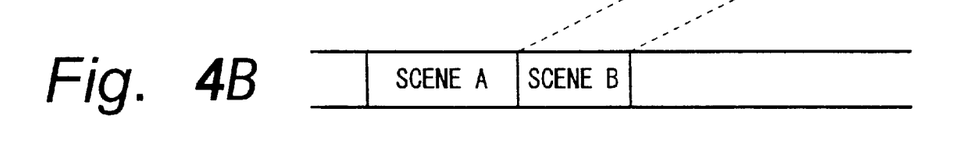

Since the magnetic tape is a linear record medium, it takes a long time to edit the A/V signal recorded thereon. For example, as shown in FIG. 4A, when sceans A and B that have been recorded at different positions of a source tape are edited as successive scenes, the scene A is reproduced from the source tape. The scene A is recorded on a destination tape. The scene B is searched and reproduced from the source tape. The scene B is recorded after the position of the scene A on the destination tape. Thus, the scenes A and B are recorded as one A/V signal (see FIG. 4B). In other words, to edit an A/V signal recored on a linear record medium such as a magnetic tape, at least two VCR units are required. In addition, a search time for a signal recorded on the tape is required. The search time is on the order of several seconds to several ten seconds.

To solve such a problem, in recent years, a technique for recording an A/V signal on a non-linear record medium that is randomly accessible has been increasingly used. In this case, as such a non-linear record medium, a hard disk drive is often used.

Figure 5:
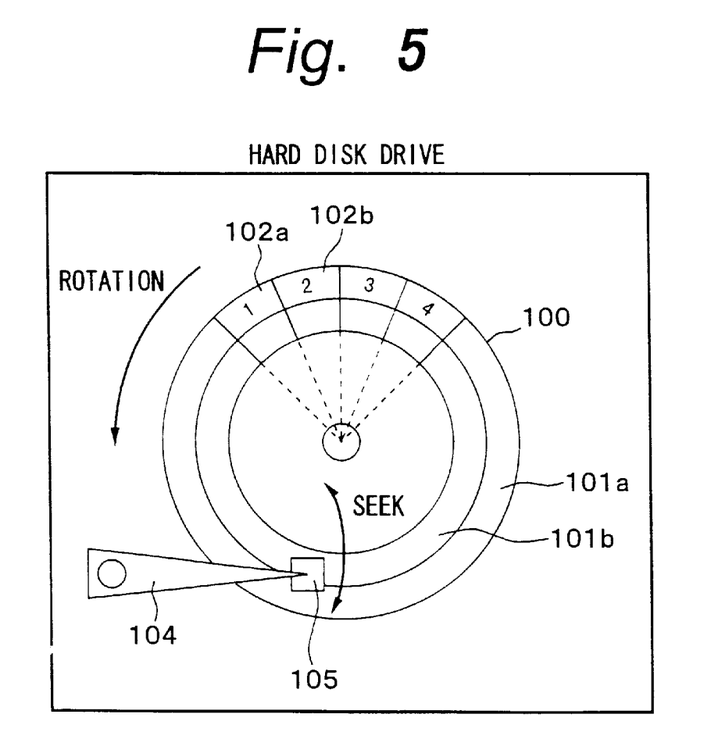
FIG. 5 is a schematic diagram showing a structure of a hard disk drive.

FIG. 5 is a schematic diagram showing a structure of the hard disk drive. Tracks 101a, 101b, and so forth are concentrically arranged on the record surface of a disk 100 that is a record medium. Each track is divided into sectors 102a, 102b, and so forth each of which has a predetermined data length. In the case of hard disk drives that record signals of computers, the data length of each sector is for example 512 bytes. On the other hand, in the case of hard disk drives that record A/V signals, the data length of each sector is for example 4096 bytes. The tracks 101a, 101b, and so forth are identified by track numbers starting with 0 from the outermost periphery to the innermost periphery. Thus, the tracks 101a, 101b, and so forth with the same numbers are cylindrically arranged on the disk 100. These cylindrical portions are referred to as cylinders. Each cylinder is identified by a cylinder number with the same value as the corresponding track number.

Likewise, sectors 102a, 102b, and so forth of each cylinder are identified by sector numbers starting with 0. When data is read or written, a target track number and a target sector number are designated to a hard disk controller. Thus, a magnetic head disposed at an edge of a movable arm 104 is moved to the target cylinder. This operation is referred to as "seek" operation. The hard disk controller waits until the disk 100 rotates and the target sector comes to the position of the magnetic head 105. This operation is referred to as "rotation wait" operation. Each sector contains a cylinder number, a sector number, and so forth as identification information at the start position thereof. While the rotation wait operation is being performed, the hard disk controller continuously reads the identification information. When the hard disk controller detects the target sector, it starts reading data.

Figure 6A:
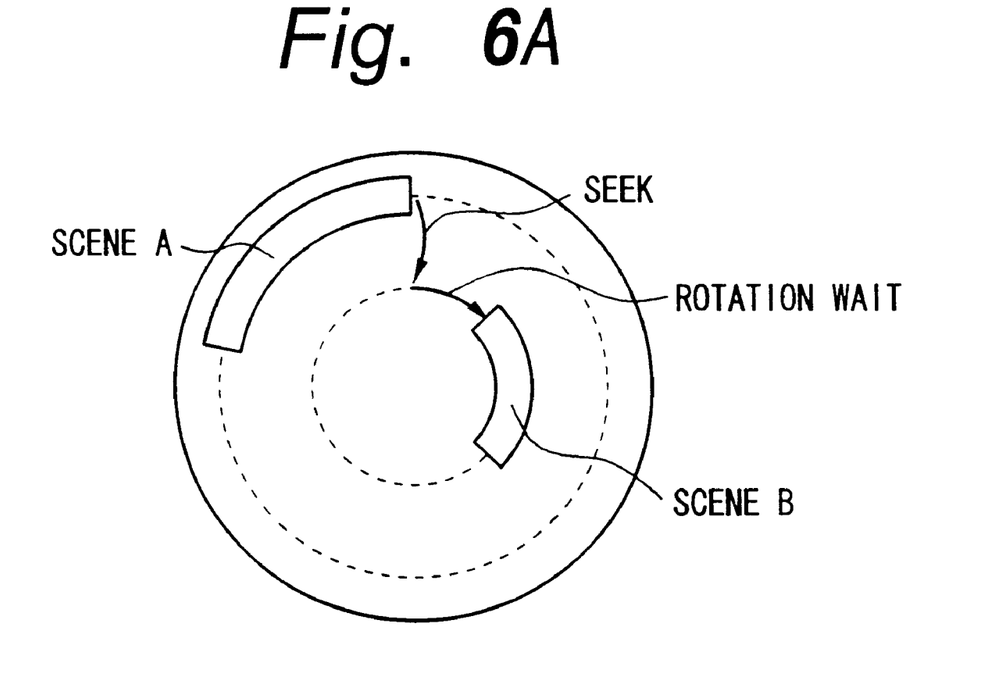
FIGS. 6A and 6B are schematic diagrams for explaining an edit operation on a hard disk.
Figure 6B:
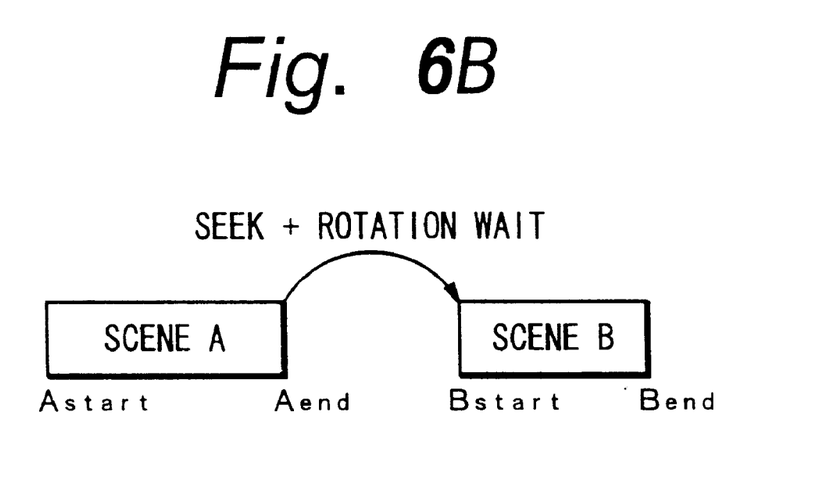

FIGS. 6A and 6B show an edit operation for an A/V signal on the hard disk. As shown in FIG. 6A, scenes A and B are recorded on an outer peripheral track and an inner peripheral track of the hard disk, respectively. When the scenes A and B are edited as one A/V signal, data of the scene A is read and reproduced with a track number and a sector number that represent the position of the scene A. After the data of the scene A has been reproduced, the seek operation and the rotation wait operation are performed with a track number and a sector number that represent the position of the scene B. Thus, the scene B is read and reproduced.

Thus, unlike with a magnetic tape as a linear record medium, on the hard disk as a non-linear record medium, the edit operation for connecting the scenes A and B and for recording the connected scenes on the tape is not performed. In other words, as shown in FIG. 6B, points $A_{start}$ and $A_{end}$ that represent the start position and the end position of the scene A and points $B_{star}$ and $B_{end}$ that represent the start position and the end position of the scene B are recorded. After data from the point $A_{start}$ to the point $A_{end}$ is reproduced, the seek operation and the rotation wait operation are performed. Thereafter, data from the point $B_{start}$ to the point $B_{end}$ is reproduced.

In this case, the seek operation and the rotation wait operation performed from the scene A to the scene B take several 10 ms to several 100 ms. This time period is much smaller than that necessary for such operations on the linear record medium. Thus, with such a non-linear record medium, discontinuous data can be continuously reproduced without need to perform the edit operation for connecting scenes. Thus, an A/V signal can be successively reproduced. Consequently, with a non-linear record medium such as a hard disk, the edit operation can be much effectively performed.

Recently, especially in professional field, an audio signal with multiple channels has been increasingly used. For example, an audio signal with four to eight channels has been recorded. For example, an audio signal is recorded in such a manner that a voice sound is recorded on the first channel, other sounds are recorded on the second and third channels, and an effect sound is recorded on the fourth channel.

On the other hand, various audio signals and video signals are recorded in one hard disk drive. Such audio signals and video signals may be edited as one A/V signal. In this case, since the seek operation should be performed for each of audio channels, the number of times of the seek operation and the seek distance increase. Thus, it is difficult to successively reproduce such signals as one A/V signal.

To solve such a problem, conventionally, a technique for recording audio signals and video signals to individual hard disk drives or another technique for recording relevant audio signals and video signals as blocks have been commonly employed.

Figure 7A:
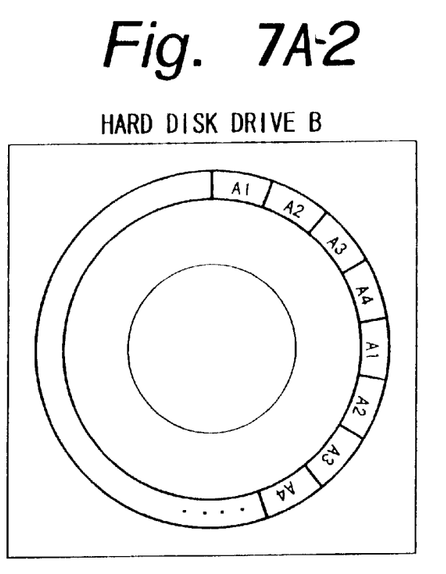
FIGS. 7A and 7B are schematic diagrams for explaining a write operation and a read operation of audio/video signals to hard disk drives according to a conventional method.
Figure 7A:
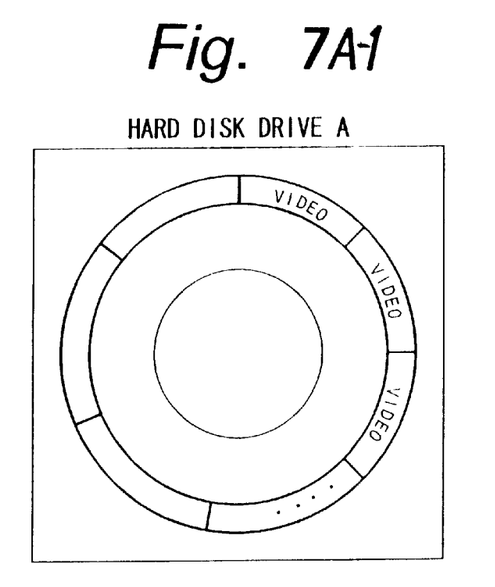
Figure 7B:
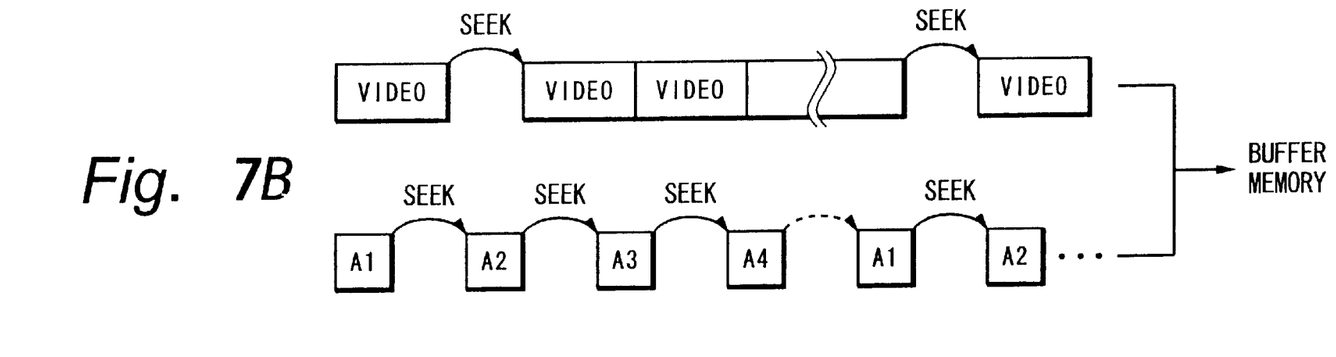

FIGS. 7A and 7B are schematic diagrams showing a method for recording audio signals and video signals to respective hard disk drives. In this method, as shown in FIG. 7A, only video signals are recorded to a hard disk drive A. On the other hand, audio signals with four channels (first to fourth channels) are recorded to a hard disk drive B.

In this method, when audio signals and video signals are independently edited, as shown in FIG. 7B, these signals can be accessed in parallel. The reproduced A/V signals are temporarily stored in a buffer memory and read therefrom at a proper timing. Thus, they are reproduced as linear A/V signals. Consequently, according to this method, successive A/V signals can be effectively reproduced. However, in this method, since two hard disk drives are required, the cost of the apparatus adversely increases.

Figure 8A:
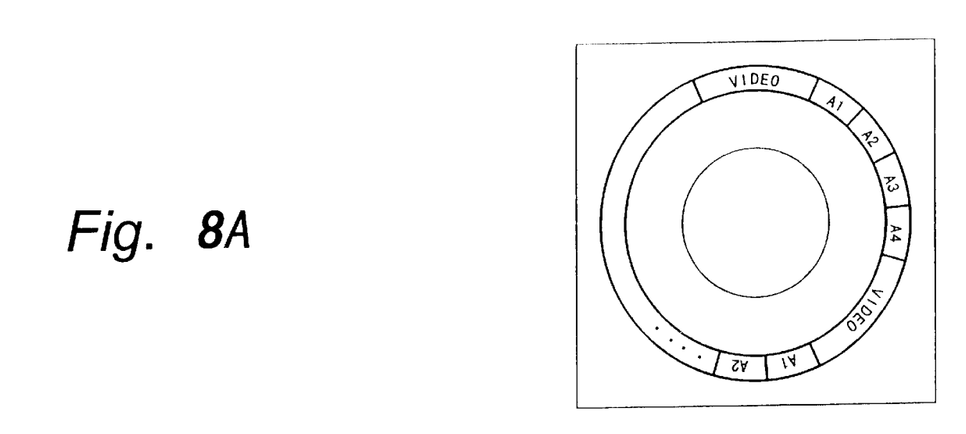
FIGS. 8A, 8B, and 8C are schematic diagrams for explaining a write operation and a read operation of audio/video signals to a hard disk drive according to another conventional method.
Figure 8B:
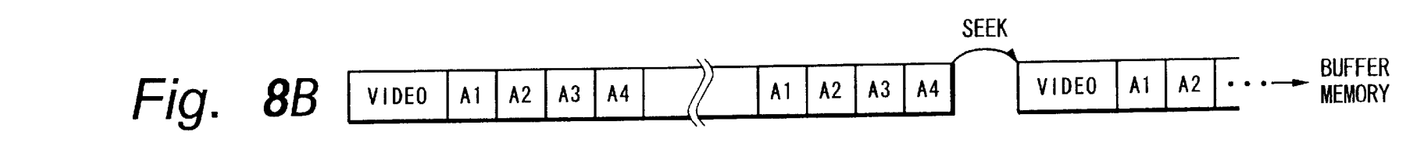

FIGS. 8A and 8B are schematic diagrams showing a method for recording relevant audio signals and video signals as blocks. In this method, as shown in FIG. 8A, when a video signal is associated with an audio signal with four channels (first to fourth channels), these signals are recorded as a block.

According to this method, as shown in FIG. 8B, the edit point of the audio signal is the same as the edit point of the video signal. When blocks of audio signals and video signals are edited, the number of times of the seek operation for the hard disk drive is small. Thus, the signals can be effectively edited. In addition, when A/V signals are simply reproduced in succession, the reproduction speed increases.

Figure 8C:
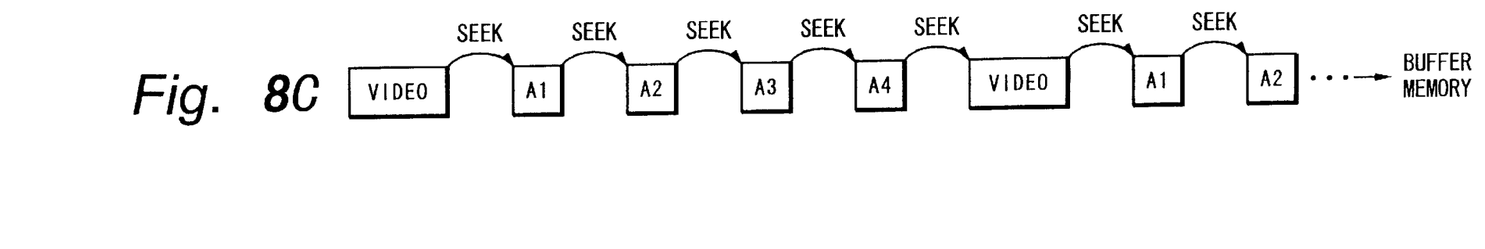

However, in the case that the edit point of an audio signal is different from the edit point of a video signal, when these signals should be independently edited, as shown in FIG. 8C, as the number of times of the seek operation increases, A/V signals read from the hard disk drive become discontinuous. Thus, it becomes difficult to read the signals from the buffer memory. Consequently, the A/V signals cannot be reproduced in succession.

Thus far, an A/V signal recording/reproducing apparatus that has the advantages of the above-described two methods that allow the parallel reproductions of audio signals and video signals using two hard disk drives and high speed successive reproductions of which relevant audio signals and video signals are recorded as blocks and that is accomplished at low cost has not be developed.

OBJECTS AND SUMMARY OF THE INVENTION

Therefore, an object of the present invention is to provide an A/V signal recording apparatus that allows the number of times of the seek operation to decrease and A/V signals recorded on the same non-linear disk record medium to be successively reproduced so as to independently edit the video signals and audio signals and a recording method thereof.

To solve the above-described problem, the present invention is a recording apparatus for recording an input video signal and an audio signal on a record medium that is randomly accessible, comprising a control means for causing the audio signal to be recorded to a predetermined region disposed in the track direction of the record medium when the video signal and the audio signal are recorded on the record medium, and a record means for recording the video signal and the audio signal on the same record medium under the control of the control means.

To solve the above-described problem, the present invention is a reproducing apparatus for reproducing an audio signal and a video signal corresponding thereto from a record medium that is randomly accessible, the audio signal and the video signal having been recorded on the record medium, the audio signal having been recorded in a predetermined region independently disposed in the track direction of the record medium, comprising a control means for causing the video signal and the audio signal recorded in the predetermined region to be reproduced when the video signal and the audio signal recorded on the record medium are reproduced, and a reproduction means for reproducing the video signal and the audio signal from the record medium under the control of the control means and reproducing the audio signal from the predetermined region under the control of the control means when the audio signal is independently reproduced.

To solve the above-described problem, the present invention is a reproducing apparatus for reproducing an audio signal and a video signal corresponding thereto from a record medium that is randomly accessible, a predetermined amount of the video signal having been recorded adjacent to a predetermined amount of the audio signal in a first region of the record medium, the audio signal having been recorded in a second region independently disposed in the track direction of the first region of the record medium, comprising a control means for causing the video signal and the audio signal that have been adjacently recorded on the record medium to be reproduced and reproducing the video signal from the first region and the audio signal from the second region when the video signal and audio signal are independently reproduced, and a reproduction means for reproducing the video signal and the audio signal from the first region and reproducing the audio signal from the second region under the control of the control means when the audio signal is independently reproduced.

To solve the above-described problem, the present invention is a recording/reproducing apparatus for recording an input video signal and an input audio signal on a record medium that is randomly accessible and reproducing the video signal and audio signal therefrom, comprising a record control means for causing the video signal and the audio signal to be recorded in a first region and the a second region, respectively, the second region being disposed in the track direction of the first region of the record medium, a record means for recording the video signal and the audio signal on the same record medium under the control of the record control means, a reproduction control means for causing the audio signal to be reproduced from the second region when the audio signal and the video signal are independently reproduced from the record medium recorded by the record means, and a reproduction means for reproducing the video signal and the audio signal from the record medium under the control of the reproduction control means and reproducing the audio signal from the second region under the control of the reproduction control means when the audio signal is independently reproduced.

To solve the above-described problem, the present invention is a recording method for recording an input video signal and an audio signal on a record medium that is randomly accessible, comprising the steps of (1) causing the audio signal to be recorded to a predetermined region disposed in the track direction of the record medium when the video signal and the audio signal are recorded on the record medium, and (2) recording the video signal and the audio signal on the same record medium corresponding to the step (1).

To solve the above-described problem, the present invention is a reproducing method for reproducing an audio signal and a video signal corresponding thereto from a record medium that is randomly accessible, the audio signal and the video signal having been recorded on the record medium, the audio signal having been recorded in a predetermined region independently disposed in the track direction of the record medium, comprising the steps of (1) causing the video signal and the audio signal recorded in the predetermined region to be reproduced when the video signal and the audio signal recorded on the record medium are reproduced, and (2) reproducing the video signal and the audio signal from the record medium by the step (1) and reproducing the audio signal from the predetermined region by the step (1) when the audio signal is independently reproduced.

To solve the above-described problem, the present invention is a reproducing method for reproducing an audio signal and a video signal corresponding thereto from a record medium that is randomly accessible, a predetermined amount of the video signal having been recorded adjacent to a predetermined amount of the audio signal in a first region of the record medium, the audio signal having been recorded in a second region independently disposed in the track direction of the first region of the record medium, comprising the steps of (1) causing the video signal and the audio signal that have been adjacently recorded on the record medium to be reproduced and reproducing the video signal from the first region and the audio signal from the second region when the video signal and audio signal are independently reproduced, and (2) reproducing the video signal and the audio signal from the first region and reproducing the audio signal from the second region by the step (1) when the audio signal is independently reproduced.

To solve the above-described problem, the present invention is a recording/reproducing method for recording an input video signal and an input audio signal on a record medium that is randomly accessible and reproducing the video signal and audio signal therefrom, comprising the steps of (1) causing the video signal and the audio signal to be recorded in a first region and the a second region, respectively, the second region being disposed in the track direction of the first region of the record medium, (2) recording the video signal and the audio signal on the same record medium by the step (1), (3) causing the audio signal to be reproduced from the second region when the audio signal and the video signal are independently reproduced from the record medium recorded by the step (2), and (4) reproducing the video signal and the audio signal from the record medium by the step (3) and reproducing the audio signal from the second region by the step (3) when the audio signal is independently reproduced.

To solve the above-described problem, the present invention is a record medium on which an input video signal and an input audio signal are recorded and from which the input video signal and the input audio signal are reproduced, the input video signal and the input audio signal being randomly accessible on the record medium, wherein a predetermined amount of the video signal and a predetermined amount of the audio signal corresponding thereto are adjacently recorded or reproduced on/from a first region, the audio signal being recorded or reproduced on/from a second region disposed in the track direction of the first region of the record medium.

To solve the above-described problem, the present invention is a record medium on which an input video signal and an input audio signal are recorded and from which the input video signal and the input audio signal are reproduced, the input video signal and the input audio signal being accessible thereon, wherein the video signal is recorded or reproduced on/from a first region of a predetermined amount of the record medium at a time, the audio signal being recorded or reproduced on/from a second region that is disposed in the track direction of the first region.

As described above, according to the present invention, since a region for only audio signals is disposed on a disk record medium, the seek distance between individual channels of audio signals can be decreased, thereby decreasing the seek time.

DETAILED DESCRIPTION OF THE PREFERRED EMBODIMENTS

Figure 1:
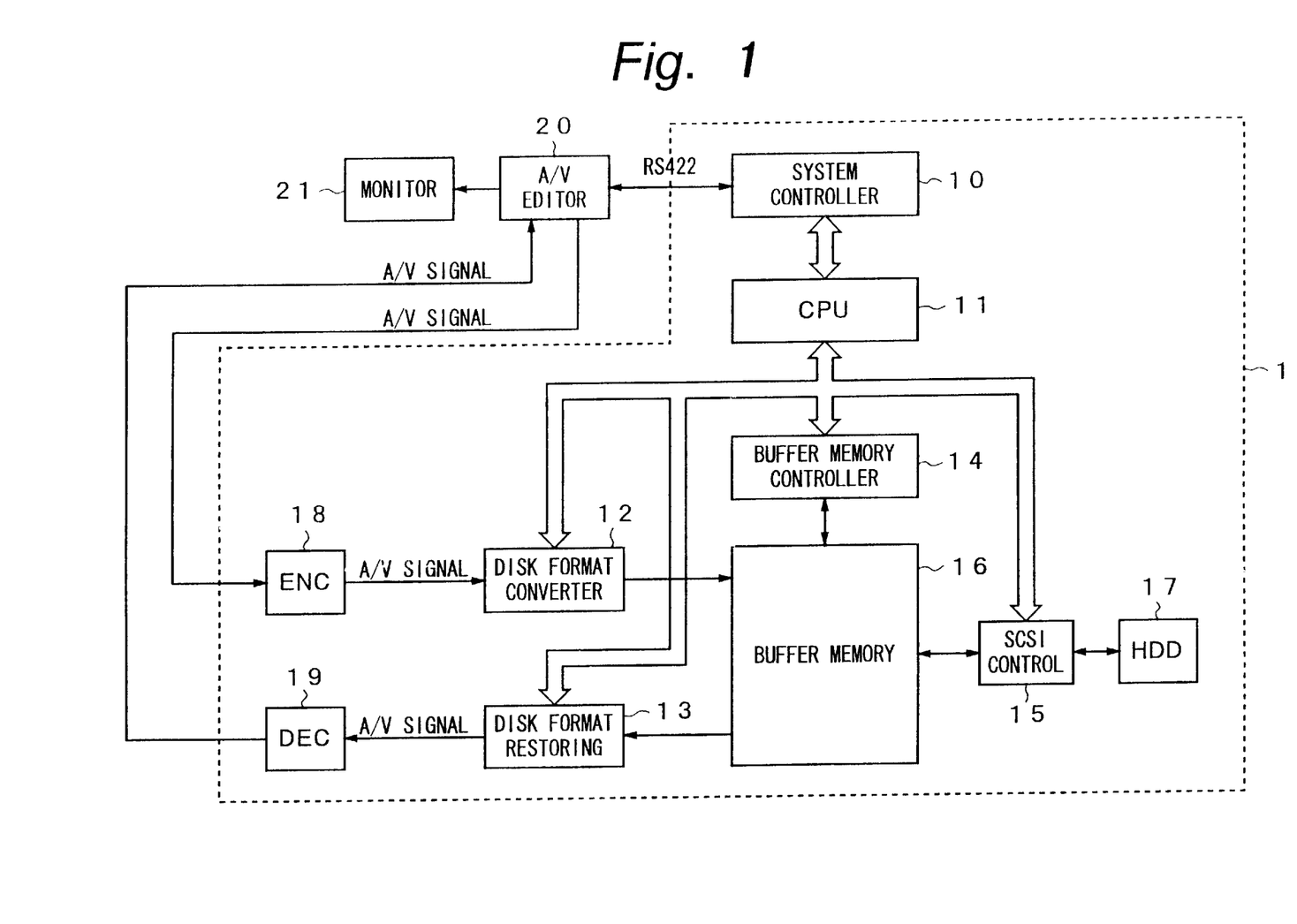
FIG. 1 is a block diagram showing an example of the structure of an A/V signal recording apparatus and an A/V signal editing system therewith.

Next, with reference to the accompanying drawings, a first aspect of the present invention will be described. FIG. 1 is a block diagram showing a structure of an A/V signal recording apparatus according to the present invention and an A/V signal editing system therewith. In FIG. 1, reference numeral 1 that is a portion surrounded by dotted lines is an A/V signal recording apparatus 1.

In the A/V signal recording apparatus, a command for causing the A/V signal recording apparatus to record/reproduce an A/V signal is supplied from the outside thereof to a system controller 10 through an interface such as RS-422 interface. The command is supplied from the system controller 10 to a CPU 11. Corresponding to the command, the CPU 11 controls a disk format converter 12, a disk format restoring unit 13, a buffer memory controller 14, and a SCSI controller 15.

The buffer memory controller 14 controls data write/read address and timings of data write/read operations of the buffer memory 16. A hard disk drive 17 has a SCSI interface. The SCSI controller 15 controls data write/read addresses such as track numbers and sector numbers of the hard disk drive 17.

The hard disk drive 17 is controlled corresponding to the CVA (Constant Angular Velocity) method of which data is read at a constant angular velocity of the disk. Alternatively, the hard disk drive 17 may be controlled corresponding to the zone CAV method of which the disk is radially zoned and data rate is circumferentially increased.

The disk format converter 12 converts a supplied digital signal into a format for the hard disk drive 17 under the control of the CPU 11. The disk format restoring unit 13 restores the digital signal read from the hard disk drive 17 and supplied through the SCSI controller 15 and the buffer memory 16 under the control of the CPU 11 into the original format.

An A/V editor 20 is composed of for example a computer. The A/V editor 20 has a user interface composed of I/O devices (such as a mouse and a keyboard) and a display. In addition, the A/V editor 20 inputs/outputs an A/V signal to/from an external device and the A/V signal recording apparatus and causes the A/V signal recording apparatus 1 to record/reproduce the A/V signals through the system controller 10 connected with for example the RS-422 interface. The A/V editor 20 is connected to a monitor 21 so as to display A/V signals received from the A/V signal recording apparatus 1.

When the user issues a command to the A/V editor 20 through the user interface, an external A/V signal can be recorded to the A/V signal recording apparatus 1 or an A/V signal recorded in the A/V signal recording apparatus can be edited. For example, when the user edits an A/V signal, he or she can designate an edit point thereof to the A/V editor 20 through the user interface while watching a picture read from the A/V signal recording apparatus 1 and displayed on the monitor 21 and listening to a sound reproduced by a sound reproducing apparatus.

An A/V signal is recorded to the A/V signal recording apparatus in the following manner. The A/V editor 20 sends a command to the system controller 10 so that a designated A/V signal is recorded to the hard disk drive 17 of the A/V signal recording apparatus 1. The system controller 10 sends a command to the CPU 11 so as to control the disk format converter 12, the buffer memory controller 14, and the SCSI controller 15.

The A/V signal to be recorded is supplied from the A/V editor 20 to the encoder 18. The A/V signal is a digital signal of which a video signal and an audio signal are serially supplied. The encoder 18 performs predetermined signal processes (such as 8/10 converting process and compressing encoding process) for the supplied A/V signal. The resultant signal is supplied to the disk format converter 12.

The disk format converter 12 converts the supplied A/V signal into the format for the hard disk drive 17 under the control of the CPU 11. An audio signal with for example four channels is divided corresponding to every two frames of a video signal. The divided portions of the audio signal and the two frames of the video signal compose one GOP (Group Of Picture). When the data length of each sector of the hard disk drive 17 is for example 4096 bytes, one GOP of a video signal corresponding to the NTSC system is assigned 42 sectors. One GOP of a video signal corresponding to the PAL system is assigned 48 sectors. One GOP of each channel of an audio signal is assigned two sectors.

The resultant A/V signal is supplied to the buffer memory 16. The buffer memory controller 14 causes the A/V signal to be stored in a predetermined region of the buffer memory 16 under the control of the CPU 11. The buffer memory controller 14 causes the A/V signal to be read from the buffer memory 16 at a predetermined timing under the control of the CPU 11. The A/V signal read from the buffer memory 16 is recorded to the hard disk drive 17 through the SCSI controller 15.

When the A/V signal is recorded to the hard disk drive 17, the SCSI controller 15 controls the hard disk drive 17 under the control of the CPU 11 and records the A/V signal to a predetermined region of the hard disk drive 17.

Figure 2A:
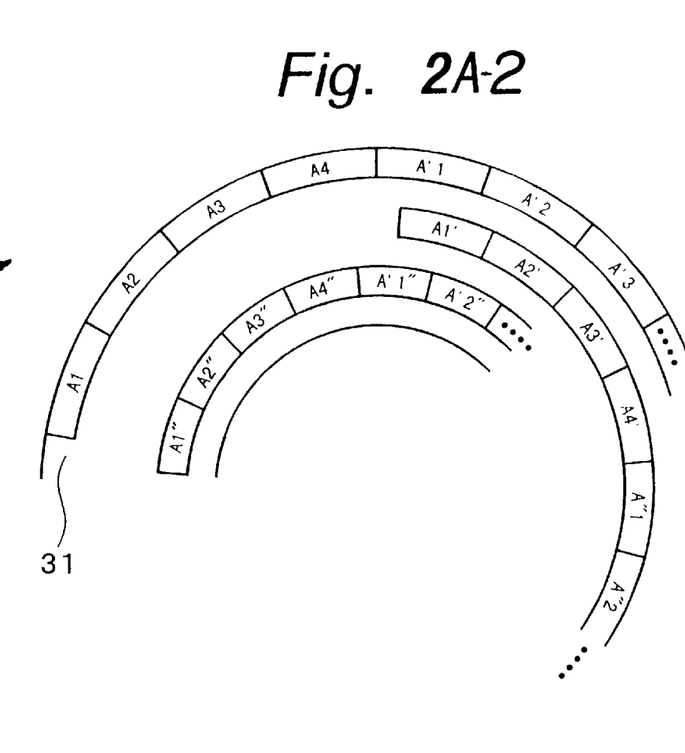
FIGS. 2A, 2B, and 2C are schematic diagrams for explaining a write operation and a read operation of audio/video signals according to a first aspect of the present invention.
Figure 2A:
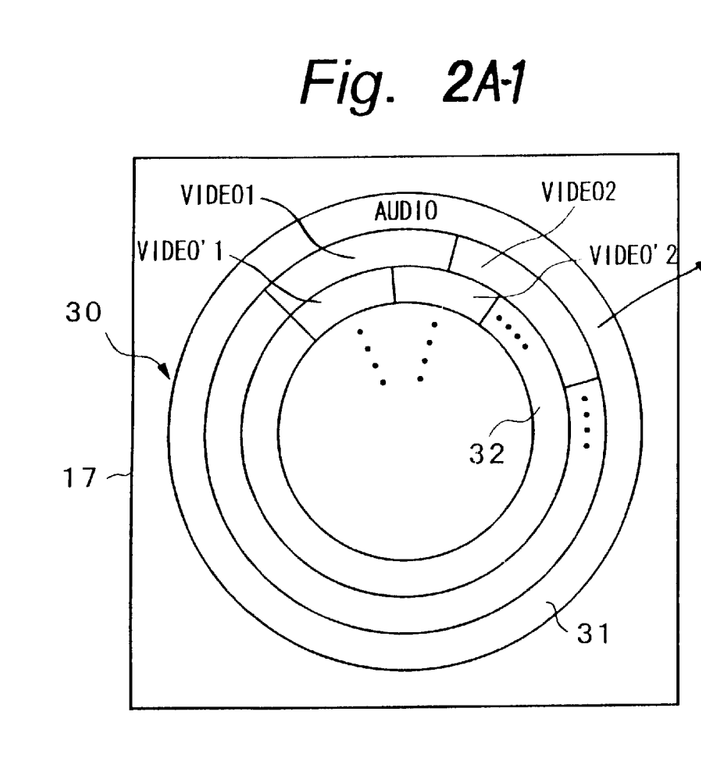

FIG. 2A shows an example of a record region for A/V signals on a record medium 30 of the hard disk drive 17. In the first aspect of the present invention, the record medium 30 is divided into an audio region 31 and a video region 32 in the track direction. Audio signals of A/V signals are recorded in the audio region 31. Video signals of A/V signals are recorded in the video region 32. Audio signals are grouped as GOPs. As shown in FIG. 2A, audio signals and video signals can be recorded on a plurality of tracks of the respective regions.

As described above, the data amount of an audio signal that requires two sectors for each channel of one GOP is much smaller than the data amount of a video signal that requires 42 sectors of one GOP in the NTSC system and 48 sectors of one GOP in the PAL system. Thus, when an audio signal is recorded corresponding to a video signal, the audio region 31 takes a smaller width (tracks) of the record medium 30 of the hard disk drive 17 than the video region 32.

Next, a read operation for reading an A/V signal that has been divided into an audio signal and a video signal and written to the record medium 30 of the hard disk drive 17 will be described. The user issues a command to the A/V editor 20 so as to read an A/V signal written to the hard disk drive 17 of the A/V signal recording apparatus 1. For example, the user issues a command to the A/V editor 20 so as to read a predetermined A/V signal and edit the A/V signal recorded on the record medium 30 of the hard disk drive 17.

Corresponding to the command, the A/V editor 20 sends a command to the system controller 10 so as to read the A/V signal. The system controller 10 sends a command to the CPU 11 so as to control the disk format restoring device 13, the buffer memory controller 14, and the SCSI controller 15.

Figure 2B:
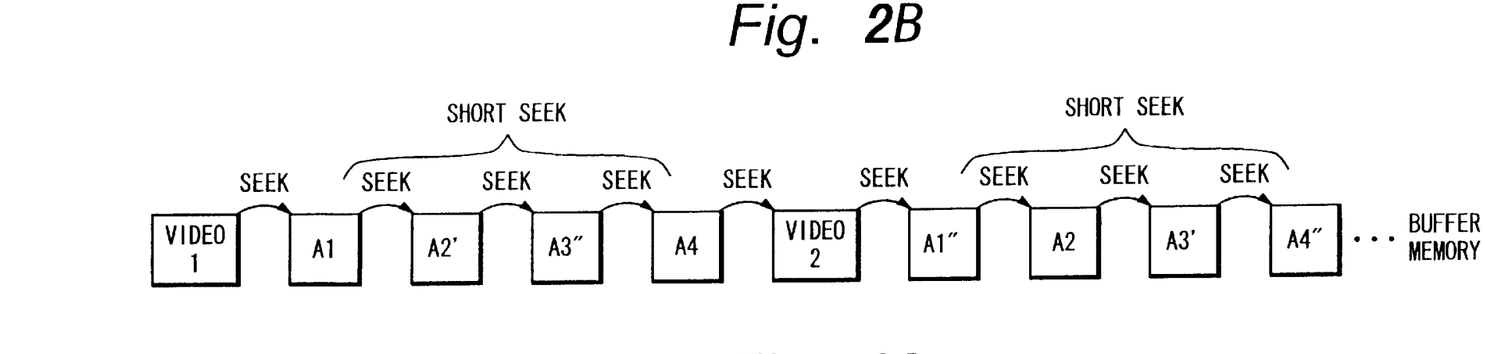

The A/V signal is read from the hard disk drive 17 under the control of the SCSI controller 15. FIG. 2B shows a read operation of a video signal and an audio signal from the record medium 30 shown in FIG. 2A in the case that the edit point of the audio signal is different from the edit point of the video signal and the audio signal and that the audio signal and the video signal are independently edited. First of all, the magnetic head (not shown) of the hard disk drive 17 is moved to the video region 32 under the control of the SCSI controller 15. One GOP (in this example, VIDEO1) of the video signal is read from the video region 32.

Thereafter, the audio region 31 is sought by the magnetic head. Thus, each channel of the designated audio signal is read from the region 31. In other words, in one GOP read sequence, the magnetic head seeks the audio region 31 from the video region 32. When the audio signal has four channels in the audio region 31, the seek operation is performed three times from A1' to A2', from A2' to A3", and from A3" to A4. Thereafter, to read the next GOP, the magnetic head seeks the video region 32 from the audio region 31. In such a manner, different tracks may be sought in the same region 31. The magnetic head reads for example VIDEO2 from the video region 32.

After VIDEO2 has been read, the magnetic head seeks the audio region 31 from the video region. Likewise, the magnetic head performs the seek operation three times from A1" to A2, from A2 to A3', and from A3' to A4".

Thus, according to the first aspect of the present invention, in one GOP read sequence, the seek operation is performed five times. However, as described above, the width of the audio region 31 of the record medium 30 of the hard disk drive is smaller than that of the video region 32 thereof. Thus, the seek distance in the audio region 31 is small. Consequently, the seek operation performed three times in the audio region 31 takes a shorter time than the seek operation performed twice between the video region 32 and the audio region 31. In other words, when an audio signal and a video signal are independently edited, since the seek operation is performed in the audio region 31 with a limited track width, the seek distance and seek time can be remarkably decreased than before.

Figure 2C:
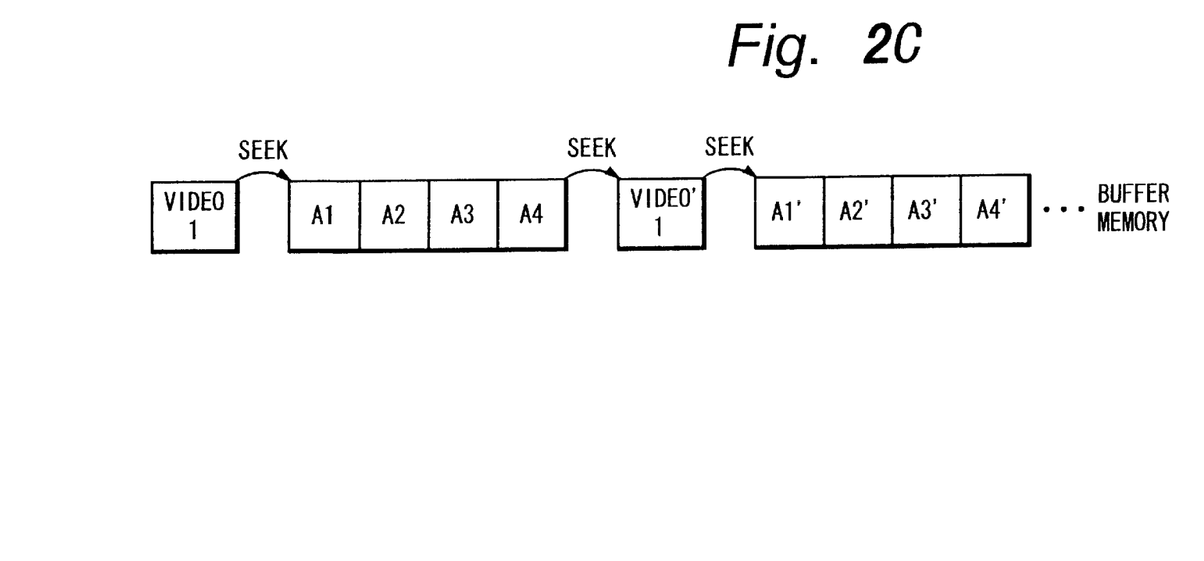

FIG. 2C shows a read operation of an audio signal and a video signal from the record medium 30 in the case that the audio signal and the video signal are edited for each GOP and that the edit point of the audio signal is the same as the edit point of the video signal. In this case, as shown in FIG. 2C, in the first aspect of the present invention of which audio signals and video signals are divided and recorded to respective regions, the magnetic head should perform the seek operation between an audio signal and a video signal.

The A/V signal read from the hard disk drive 17 is supplied to the buffer memory 16. The buffer memory controller 14 causes the A/V signal to be stored in a predetermined region of the buffer memory 16 under the control of the CPU 11.

The buffer memory controller 14 causes the A/V signal to be read from the buffer memory 16 at a predetermined timing under the control of the CPU 11. This timing is controlled so that the time difference of the seek operation for the A/V signal read from the hard disk drive 17 is compensated and the A/V signal corresponding to the original GOP is obtained.

The A/V signal read from the buffer memory 16 is supplied to the disk format restoring unit 13 controlled by the CPU 11. The disk format restoring unit 13 restores the GOP format corresponding to the sectors of the record medium 30 of the hard disk drive 17 into an A/V signal of video signals and audio signals that are serially sent.

The restored A/V signal is supplied to the decoder 19. The decoder 19 performs reverse conversions as those performed in the encoder 18 (namely, the decoder 19 performs decoding operation and 10/8 converting operation). The resultant A/V signal is supplied to the A/V editor 20.

Figure 3A:
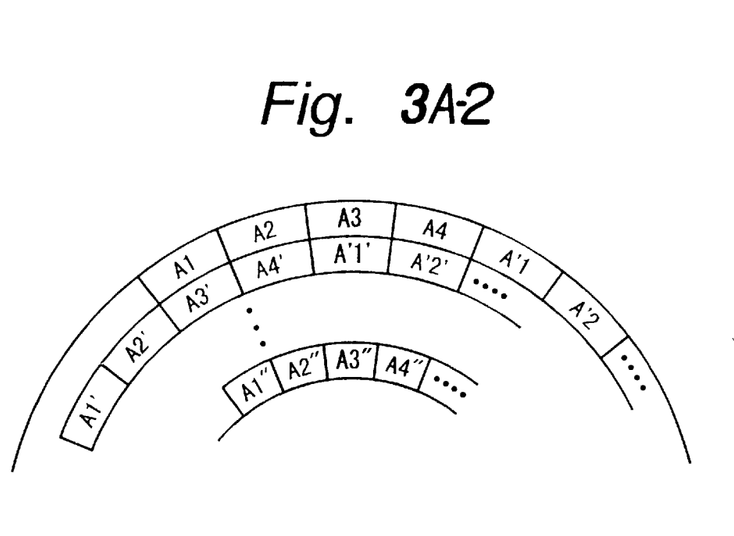
FIGS. 3A, 3B, and 3C are schematic diagrams for explaining a write operation and a read operation of audio/video signals according to a second aspect of the present invention.
Figure 3A:
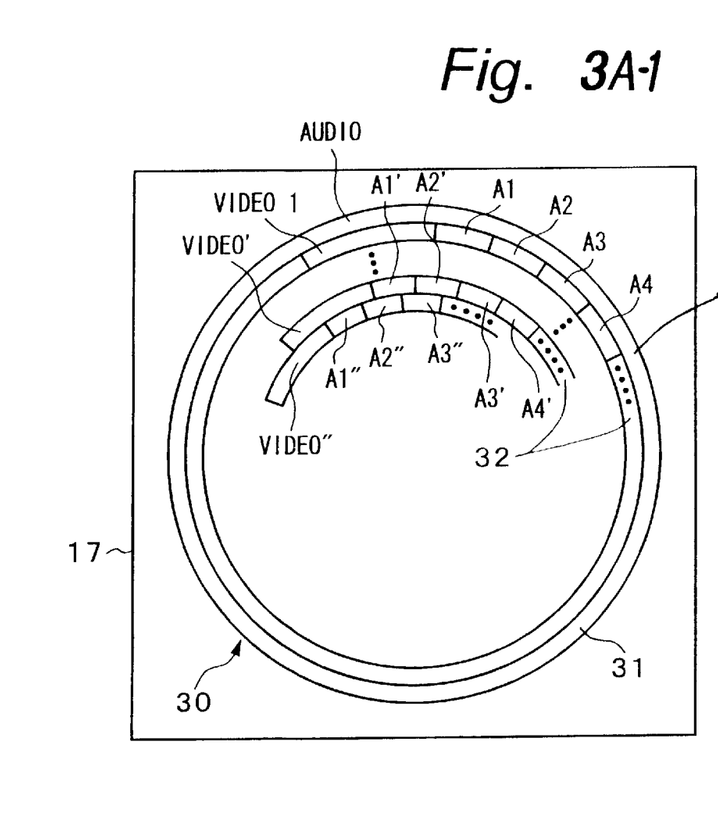

Next, with reference to the accompanying drawings, a second aspect of the present invention will be described. FIG. 3A shows an example of a record region of an A/V signal on the record medium 30 of the hard disk drive 17. In the second aspect of the present invention, an audio/video region 32' is disposed. In the audio/video region 32', a video signal and an audio signal are grouped for each GOP. In addition, as with the first aspect of the present invention, an audio signal for each channel is written to the audio region 31. As with the first aspect of the present invention, as shown in FIG. 3A, the audio signal may be written to a plurality of tracks.

The structure of the A/V signal recording apparatus 1 according to the second aspect of the present invention is the same as that according to the first aspect of the present invention. Thus, for simplicity, the description of signal processes in the A/V signal recording apparatus 1 is omitted.

Figure 3B:
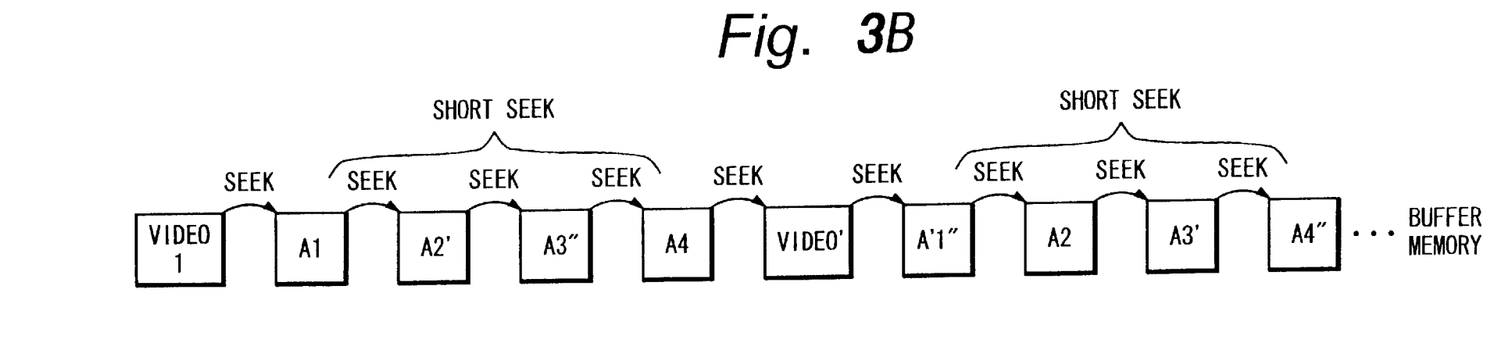

FIG. 3B shows a read operation of an audio signal and a video signal read from the record medium 30 shown in FIG. 3A in the case that the audio signal and the video signal are independently edited. In this case, as with the first aspect of the present invention, the magnetic head of the hard disk drive 17 is moved to the audio/video region 32'. One GOP of the video signal is read from the audio/video region 32'. Thereafter, the magnetic head seeks the audio region 31 so as to read a designated audio signal for each channel. Thus, in the second aspect of the present invention, as with the first aspect, an audio signal can be read in a short seek time. In other words, as with the first aspect of the present invention, when an audio signal and a video signal are independently edited, since the magnetic head seeks the audio region 31 that has a limited track width, the seek distance and seek time can be remarkably decreased in comparison with those of the conventional apparatuses.

Figure 3C:
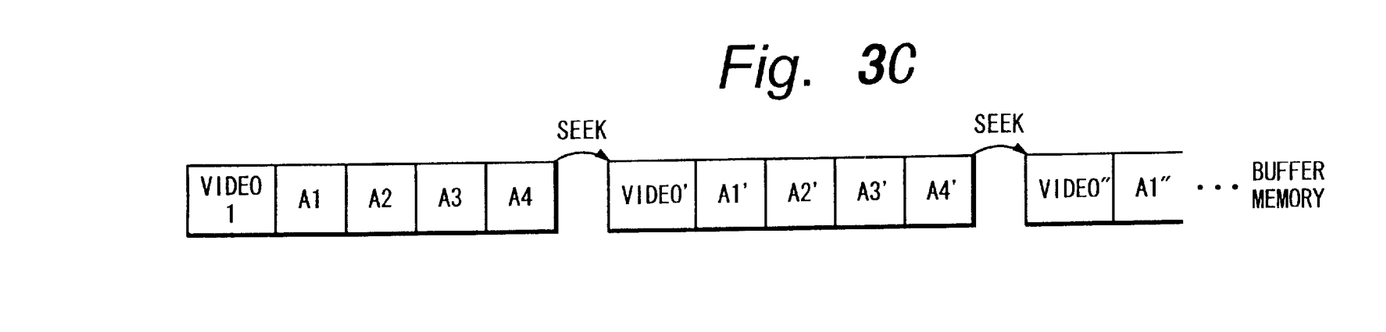

FIG. 3C shows a read operation of an audio signal and a video signal read from the record medium 30 in the case that the edit point of the audio signal is the same as the edit point of the video signal and that the audio signal and the video signal are edited for each GOP. In this case, since the audio signal and the video signal are grouped as GOPs, the magnetic head seeks only the audio/video region 32' in which GOPs are not successive. In other words, after a video signal VIDE01 is read, audio signals A1, A2, A3, and A4 are read. The magnetic head seeks the audio/video region 32' and reads a video signal VIDEO' and then audio signals A1', A2', A3', and A4'. Thereafter, the magnetic head seeks the audio/video region 32' and reads a VIDEO' signal and so forth. Thus, the number of times of the seek operation is very small. In addition, A/V signals can be easily reproduced in succession.

When A/V signals are successively reproduced, not edited, they can be successively read from the audio/video region 32'. Thus, since it is not necessary to perform the seek operation, the A/V signals can be transferred at a higher speed several times than the speed of the real reproducing operation.

In the second aspect of the present invention, audio signals are redundantly written to both the audio/video region 32' and the audio region 31. However, as described above, the number of sectors required for audio signals is much smaller than that for video signals. Thus, the loss of the storage capacity of the record medium 30 can be ignored.

In the above description, the audio region 31 is disposed outside the video region 32 or the audio/video region 32'. However, the present invention is not limited to such a structure. In other words, for example the audio region 31 may be disposed inside the region 32 or 32'. Alternatively, a plurality of audio regions 30 and video regions 32 or audio/video regions 32' may be alternatively disposed on the record medium 30.

In the above description, A/V signals that are input/output to/from the A/V signal recording apparatus 1 are digital signals. However, the present invention is not limited to such an example. In other words, when an A/D converter and a D/A converter are disposed before the encoder 18 and after the decoder 19, respectively, analog signals can be input/output.

In the above description, A/V signals are recorded to the record medium 30 of the hard disk drive 17. However, the present invention is not limited to such an example. Instead, another record medium such as an MO disc (magnetic optical disc) can be used as long at it can non-linearly record A/V signals.

As described above, according to the present invention, a region for only audio signals is disposed on a record medium in addition to a region for audio signals and video signals. Thus, in the case that an audio signal has many channels, that video signals and audio signals are independently edited, and that the magnetic head of the hard disk drive should seek each channel of the audio signals, the seek distance and seek time are small. Thus, A/V signals can be easily reproduced in succession.

In addition, according to the second aspect of the present invention, a region for only audio signals is disposed on a record medium in addition to a region for audio signals and video signals. Thus, as well as the case that the seek operation is required for each channel of an audio signal, even if the edit point of an audio signal is the same as the edit point of a video signal and these signals are read and edited at the same time, the number of times of the seek operation and the seek time are small. With the similar reason, A/V signals can be successively read and reproduced at high speed.

Thus, according to the present invention, in the A/V signal recording apparatus that can record audio signals and video signals on the same record medium, both requirements of independent edit operations of audio signals and video signals and high speed successive read operation that are not impossible with the conventional apparatuses can be accomplished at relatively low cost.

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention.

What is claimed is:

1. A recording apparatus for recording an input video signal and an audio signal on a record medium that is randomly accessible, comprising:

control means for causing the audio signal to be redundantly recorded to at least a predetermined physical region positioned apart from a physical region in which said video signal and said audio signal are recorded and disposed in the track direction of the record medium when the video signal and the audio signal are recorded on the record medium; and record means for recording the video signal and the audio signal on the same record medium under the control of said control means.

2. The recording apparatus as set forth in claim 1, wherein said control means causes the audio signal to be recorded to a predetermined physical region in a concentric circle with a predetermined track width in the track direction of the record medium.

3. The recording apparatus as set forth in claim 1, wherein said control means causes the video signal and the audio signal to be recorded in a first region on the record medium such that a predetermined amount of the audio signal is disposed adjacent to a predetermined amount of the video signal, and the audio signal is redundantly recorded in said Predetermined physical region on the record medium, said predetermined physical region being disposed in the track direction of the record medium.

4. The recording apparatus as set forth in claim 1, further comprising:

format conversion means for converting the input video signal and the input audio signal into a format for the record medium and outputting the resultant signals to said control means.

5. The recording apparatus as set forth in claim 1, further comprising:

compression means for compression-encoding the input video signal and the input audio signal and outputting the resultant video signal and audio signal to said control means.

6. The recording apparatus as set forth in claim 1, further comprising:

compression means for compression-encoding only the input video signal and outputting the resultant video signal to said control means.

7. A reproducing apparatus for reproducing an audio signal and a video signal corresponding thereto from a record medium that is randomly accessible, the audio signal and the video signal having been recorded adjacent each other on the record medium, the audio signal having been redundantly recorded in a predetermined physical region of said record medium independently positioned apart from a physical region in which said video signal is recorded, and disposed in the track direction of the record medium, comprising:

control means for causing the video signal and the audio signal recorded adjacent each other to be reproduced when the video signal and the audio signal recorded on the record medium are reproduced, and for causing the audio signal from the predetermined region positioned physically apart from a physical region in which said video signal is recorded to be reproduced when the audio signal is to be independently reproduced; and reproduction means for reproducing the video signal and the audio signal from the record medium under the control of said control means.

8. The reproducing apparatus as set forth in claim 7, wherein said control means is connected to an external editing unit, receives a control signal therefrom, and causes the audio signal and the video signal to be independently reproduced from the record medium corresponding to the control signal.

9. The reproducing apparatus as set forth in claim 7, further comprising:

format restoration means for restoring the video signal and audio signal in the format from the record medium reproduced by said reproduction means under the control of said control means into a video signal and an audio signal that is serially sent.

10. The reproducing apparatus as set forth in claim 7, further comprising:

decode means for decoding the compression-encoded audio signal and/or video signal received from said reproduction means and outputting the resultant signal.

11. A reproducing apparatus for reproducing an audio signal and a video signal corresponding thereto from a record medium that is randomly accessible, a predetermined amount of the video signal having been recorded adjacent to a predetermined amount of the audio signal in a first region of the record medium, the audio signal having been redundantly recorded in a second region of the record medium independently positioned physically apart from a physical region in which said video signal is recorded, and disposed in the track direction of the first region of the record medium, comprising:

control means for causing the video signal and the audio signal that have been adjacently recorded on the record medium to be reproduced when the video signal and the audio signal are to be reproduced in connection with each other, and reproducing the video signal from the first region and the audio signal from the second region when the video signal and audio signal are to be independently reproduced; and reproduction means for reproducing the video signal and the audio signal from the first region and reproducing the audio signal from the second region under the control of said control means.

12. The reproducing apparatus as set forth in claim 11, wherein said control means is connected to an external editing unit and receives a control signal therefrom and in turn causes said reproduction means to independently reproduce the audio signal.

13. The reproducing apparatus as set forth in claim 11, further comprising:

format restoration means for restoring the video signal and audio signal in the format for the record medium reproduced by said reproduction means into a video signal and an audio signal that is serially sent.

14. The reproducing apparatus as set forth in claim 11, further comprising:

decode me ans for decoding the compression-encoded audio signal and/or video signal received from said reproduction means and outputting the resultant signal.

15. A recording/reproducing apparatus for recording an input video signal and an input audio signal on a record medium that is randomly accessible and reproducing the video signal and audio signal therefrom, comprising:

record control means for causing the video signal and the audio signal to be recorded in a first region and the audio signal to be redundantly recorded in a second region of said record medium, respectively, the second region being positioned physically apart from said first region, and disposed in the track direction of the first region of the record medium;

record means for recording the video signal and the audio signal on the same record medium under the control of said record control means;

reproduction control means for causing the video signal and the audio signal recorded in the first region to be reproduced when the video signal and the audio signal recorded on the record medium are to be reproduced, and for causing the audio signal to be reproduced from the second region when the audio signal and the video signal are to be independently reproduced from the record medium recorded by said record means; and reproduction means for reproducing the video signal and the audio signal from the record medium under the control of said reproduction control means.

16. The recording/reproducing apparatus as set forth in claim 15, wherein said control means causes the audio signal to be recorded to a predetermined region in a concentric circle with a predetermined track width in the track direction of the record medium.

17. The recording/reproducing apparatus as set forth in claim 15, wherein said control means causes the video signal and the audio signal to be recorded in said first region on the record medium such that a predetermined amount of the audio signal is disposed adjacent to a predetermined amount of the video signal, and the audio signal to be redundantly recorded in said second region on the record medium, the second region being disposed in the track direction of the record medium.

18. The recording/reproducing apparatus as set forth in claim 15, wherein said control means causes the input video signal and the audio to be recorded to the record medium signal such that the video signal is recorded in a region that is different from the predetermined region for the audio signal.

19. The recording/reproducing apparatus as set forth in claim 15, wherein said reproduction control means causes the video signal and audio signal to be reproduced from the first region when the video signal and the audio signal are to be reproduced in connection with each other, and causes the video signal to be reproduced from the first region and causes the audio signal to be reproduced from the second region when the video signal and the audio signal are to be independently reproduced.

20. The recording/reproducing apparatus as set forth in claim 16, wherein said control means is connected to an external editing unit, receives a control signal therefrom, and in turn causes the audio signal and the video signal to be independently reproduced from the record medium corresponding to the control signal.

21. The recording/reproducing apparatus as set forth in claim 15, further comprising:

format conversion means for converting the input video signal and the input audio signal into a format for the record medium.

22. The recording/reproducing apparatus as set forth in claim 15, further comprising:

format restoration means for restoring the video signal and audio signal in the format for the record medium reproduced by said reproduction means under the control of said control means into the input video signal and the input audio signal.

23. The recording/reproducing apparatus as set forth in claim 15, further comprising:

compression means for compression-encoding the input video signal and the input audio signal and outputting the resultant video signal and audio signal to said record control means.

24. The recording/reproducing apparatus as set forth in claim 15, further comprising:

compression means for compression-encoding only the input video signal and outputting the resultant video signal to said record control means.

25. The recording/reproducing apparatus as set forth in claim 15, further comprising:

decode means for decoding the compression-encoded audio signal and/or video signal received from said reproduction means and outputting the resultant signal.

26. A recording method for recording an input video signal and an audio signal on a record medium that is randomly accessible, comprising the steps of:

causing the audio signal to be redundantly recorded to at least a predetermined physical region positioned apart from a physical region in which said video signal and said audio signal are recorded, and disposed in the track direction of the record medium when the video signal and the audio signal are recorded on the record medium; and recording the video signal and the audio signal on the same record medium.

27. The recording method as set forth in claim 26, wherein the audio signal is recorded to a physical predetermined region in a concentric circle with a predetermined track width in the track direction of the record medium.

28. The recording method as set forth in claim 26, wherein the video signal and the audio signal are recorded in a first region on the record medium such that a predetermined amount of the audio signal is disposed adjacent to a predetermined amount of the video signal, and the audio signal is redundantly recorded in said predetermined physical region on the record medium, said predetermined physical region being disposed in the track direction of the record medium.

29. The recording method as set forth in claim 26, further comprising the step of:

converting the input video signal and the input audio signal into a format for the record medium and outputting the resultant signals.

30. The recording method as set forth in claim 26, further comprising the step of:

compression-encoding the input video signal and the input audio signal and outputting the resultant video signal and audio signal.

31. The recording method as set forth in claim 26, further comprising the step of:

compression-encoding only the input video signal and outputting the resultant video signal.

32. A reproducing method for reproducing an audio signal and a video signal corresponding thereto from a record medium that is randomly accessible, the audio signal and the video signal having been recorded adjacent each other on the record medium, the audio signal having been redundantly recorded in a predetermined physical region of said recording medium independently positioned apart from a physical region in which said video signal is recorded, and disposed in the track direction of the record medium, comprising the steps of:

causing the video signal and the audio signal recorded adjacent each other to be reproduced when the video signal and the audio signal recorded on the record medium are reproduced, and causing the audio signal from the predetermined region positioned apart from a physical region in which said video signal is recorded to be reproduced when the audio signal is to be independently reproduced; and     reproducing the video signal and the audio signal from the record medium.

33. The reproducing method as set forth in claim 32, wherein a control signal is received from an external editing unit so as to cause the audio signal and the video signal to be independently reproduced from the record medium corresponding to the control signal.

34. The reproducing method as set forth in claim 32, further comprising the step of:

restoring the video signal and audio signal in the format from the record medium into a video signal and an audio signal that is serially sent.

35. The reproducing method as set forth in claim 32, further comprising the step of:

decoding the compression-encoded audio signal and/or video signal and outputting the resultant signal.

36. A reproducing method for reproducing an audio signal and a video signal corresponding thereto from a record medium that is randomly accessible, a predetermined amount of the video signal having been recorded adjacent to a predetermined amount of the audio signal in a first region of the record medium, the audio signal having been redundantly recorded in a second region of the record medium independently positioned apart from a physical region in which said video signal is recorded, and disposed in the track direction of the first region of the record medium, comprising the steps of:

causing the video signal and the audio signal that have been adjacently recorded on the record medium to be reproduced when the video signal and the audio signal are to be reproduced in connection with each other, and reproducing the video signal from the first region and the audio signal from the second region when the video signal and audio signal are to be independently reproduced; and     reproducing the video signal and the audio signal from the first region and reproducing the audio signal from the second region.

37. The reproducing method as set forth in claim 36, wherein a control signal is received from an external editing unit and the video signal and the audio signal recorded on the record medium are independently reproduced corresponding to the control signal.

38. The reproducing method as set forth in claim 36, further comprising the step of:

restoring the video signal and audio signal in the format for the record medium into a video signal and an audio signal that is serially sent.

39. The reproducing method as set forth in claim 36, further comprising the step of:

decoding the audio signal and/or video signal and outputting the resultant signal.

40. A recording/reproducing method for recording an input video signal and an input audio signal on a record medium that is randomly accessible and reproducing the video signal and audio signal therefrom, comprising the steps of:

causing the video signal and the audio signal to be recorded in a first region and the audio signal to be redundantly recorded in a second region of said record medium, respectively, the second region being positioned physically apart from said first region, and disposed in the track direction of the first region of the record medium;

recording the video signal and the audio signal on the same record medium;

causing the video signal and the audio signal recorded in the first region to be reproduced when the video signal and the audio signal recorded on the record medium are to be reproduced, and for causing the audio signal to be reproduced from the second region when the audio signal and the video signal are to be independently reproduced from the record medium; and     reproducing the video signal and the audio signal from the record medium.

41. The recording/reproducing method as set forth in claim 40, wherein the audio signal is caused to be recorded to a predetermined region in a concentric circle with a predetermined track width in the track direction of the record medium.

42. The recording/reproducing method as set forth in claim 40, wherein the video signal and the audio signal are caused to be recorded in said first region on the record medium such that a predetermined amount of the audio signal is disposed adjacent to a predetermined amount of the video signal, and the audio signal to be redundantly recorded in said second region on the record medium, the second region being disposed in the track direction of the record medium.

43. The recording/reproducing method as set forth in claim 40, wherein the input video signal and the audio signal are caused to be recorded to the record medium signal such that the video signal is recorded in a region that is different from the predetermined region for the audio signal.

44. The recording/reproducing method as set forth in claim 40, wherein the video signal and audio signal are caused to be reproduced from the first region when the video signal and the audio signal are to be reproduced in connection with each other, and the audio signal is caused to be reproduced from the second region when the video signal and the audio signal are to be independently reproduced.

45. The recording/reproducing method as set forth in claim 40, wherein a control signal is received from an external editing unit and in turn causes the audio signal and the video signal to be independently reproduced from the record medium corresponding to the control signal.

46. The recording/reproducing method as set forth in claim 40, further comprising the step of:

converting the input video signal and the input audio signal into a format for the record medium.

47. The recording/reproducing method as set forth in claim 40, further comprising the step of:

restoring the video signal and audio signal in the format for the record medium into the input video signal and the input audio signal that are serially sent.

48. The recording/reproducing method as set forth in claim 40, further comprising the steps of:

compression-encoding the input video signal and the input audio signal, and recording the compression-encoded video signal and audio signal to the record medium.

49. The recording/reproducing method as set forth in claim 40, further comprising the steps of:

compression encoding only the input video signal, and recording the compression-encoded video signal and the input audio signal to the record medium.

50. The recording/reproducing method as set forth in claim 40, further comprising the step of:

decoding the audio signal and/or video signal and outputting the resultant signal.

51. A record medium on which an input video signal and an input audio signal are recorded and from which the input video signal and the input audio signal are reproduced, the input video signal and the input audio signal being randomly accessible on the record medium, wherein a predetermined amount of the video signal and a predetermined amount of the audio signal corresponding thereto are adjacently recorded on and reproduced from a first physical region, the audio signal being redundantly recorded on so as to be reproduced from a second physical region positioned physically apart from said first physical region, and disposed in the track direction of the first region of the record medium.

52. The record medium as set forth in claim 51, wherein the input video signal and the input audio signal have been compression-encoded, the compression encoded video signal and audio signal being recorded or reproduced, the predetermined amount being one GOP that is a compression-encoding unit.

53. A record medium on which an input video signal and an input audio signal are recorded and from which the input video signal and the input audio signal are reproduced, the input video signal and the input audio signal being accessible thereon, wherein the video signal and the audio signal are recorded on and reproduced from a first physical region of a predetermined amount of the record medium at a time, the audio signal being redundantly recorded on and reproduced from a second physical region that is positioned apart from the first physical region, and disposed in the track direction of the first region.

54. The record medium as set forth in claim 53, wherein the input video signal and the input audio signal have been compression-encoded, the compression encoded video signal and audio signal being recorded or reproduced, the predetermined amount being one GOP that is a compression-encoding unit.

* * * * *